United States Patent [19]
Steinberger et al.

[11] Patent Number: 5,595,249
[45] Date of Patent: Jan. 21, 1997

[54] GROUND LEVELER ATTACHMENT FOR A GROUND WORKING DEVICE

[76] Inventors: Dan P. Steinberger, 1617 E. 14th St., West Fargo, N. Dak. 58078; Jack Oberlander, 3201 First St. North, Fargo, N. Dak. 58102

[21] Appl. No.: 523,152

[22] Filed: Sep. 5, 1995

[51] Int. Cl.⁶ .................................................. A01B 49/02
[52] U.S. Cl. ................. 172/156; 172/159; 172/265; 172/708; 172/711; 172/570; 248/900
[58] Field of Search .................... 172/156, 159, 172/160, 182, 203, 264, 265, 705, 707, 708, 711, 709, 570–572; 267/74; 248/548, 900; 182/127

[56] References Cited

U.S. PATENT DOCUMENTS

| | | | |
|---|---|---|---|
| 1,651,938 | 12/1927 | Wolf | 172/570 |
| 2,070,509 | 2/1937 | Chiles | 172/156 |
| 3,175,622 | 3/1965 | Stam | 172/159 |
| 3,227,226 | 1/1966 | Bayne | 172/159 |
| 3,251,423 | 5/1966 | McCauley | 172/159 |
| 3,306,241 | 2/1967 | Copple | 172/156 |
| 4,485,878 | 12/1984 | Uken | 172/156 |

FOREIGN PATENT DOCUMENTS 557467  11/1943  United Kingdom ............... 172/570

*Primary Examiner*—Terry Lee Melius
*Assistant Examiner*—Victor Batson
*Attorney, Agent, or Firm*—David A. Lingbeck

[57] ABSTRACT

A ground leveler attachment for a ground working device comprises a bracket fastened to a shank supporting a ground breaking tool, a carrier arm connected to the bracket, a pair of leg supports in pivotal contact with the carrier arm, a pair of springs biasing the legs supports into pivotal contact with the carrier arm, a pair of leg members extending from the leg supports, and a pair of levelers rotatably mounted upon the leg members and biased into a ground engagement position by the springs. The levelers independently and resiliently retract upon contact with a relatively immoveable object or objects to avoid being broken off from the leg members or severely damaged beyond usefulness.

13 Claims, 4 Drawing Sheets

5,595,249

1

GROUND LEVELER ATTACHMENT FOR A GROUND WORKING DEVICE

BACKGROUND OF THE INVENTION

This invention relates to a ground leveler attachment for a ground working device such as cultivators which are used to loosen and break up the ground. The ground leveler attachment essentially follows behind and to the sides of the ground loosening tool on the cultivator and levels the loosened ground which is heaped in rows by the ground breaking tool.

Ground levelers are not new in the art. What is new is that the present invention describes a ground leveler attachment where each leveler tool is capable of independently and resiliently retracting upon contact with a relatively immoveable object or objects to avoid breaking off or becoming bent beyond usefulness, a problem not addressed by the prior art.

One known prior art is a CULTIVATOR, U.S. Pat. No. 806,100, ISSUED Dec. 5, 1905, and invented by C. J. BORDEN, which comprises ground breaking tools and levelers in a gang sections where the gang sections tend to slightly pivot in response to the changes in the topography of the land, but each leveler in a gang section cannot retract individually.

Another known prior art is a TRACTOR-MOUNTED TWO-WAY PLOW, U.S. Pat. No. 2,963,097, ISSUED Dec. 6, 1960, and invented by W. H. SILVER ETAL, which comprises a ground breaking tool mounted on a rigid, stiff shaft which could break off or become unuseably bent upon contact with relatively immoveable objects.

Another known prior art is a DISK GANG SPRING BIASING MEANS, U.S. Pat. No. 2,610,453, ISSUED Sep. 16, 1952, and invented by C. H. WHITE, which comprises a spring biasing means for a gang section having a plurality of disks on each gang section, each of the disks not capable of retracting independently of the other disks in the gang section.

There is a need for a ground leveler attachment where each leveler can resiliently retract independently of other levelers in the same gang section upon a single leveler coming into contact with relatively immoveable objects capable of damaging the leveler.

SUMMARY OF THE INVENTION

This invention relates to a ground leveler attachment for a ground working device, which comprises a bracket fastenably attached to a shank supporting a ground breaking tool on the ground working device, a carrier arm pivotally attached to the bracket, a pair of leg supports pivotally connected to the carrier arm, a pair of spring means connected to the carrier arm and connected to the leg supports for pivotally holding the leg supports in contactable relationship with the carrier arm, a pair of leg members depending from the ends of the leg supports, a pair of leveler supports attached at the bottom ends of the leg members, and a pair of levelers rotatably mounted upon the leveler supports. The levelers are ground engageably biased and will resiliently retract in response to contact with relatively immoveable objects such as rocks or boulders.

One objective of the present invention is to provide a ground leveler attachment for a ground working device which won't break off or become bent and unuseable upon contact with large relatively immoveable objects such as rocks or boulders.

2

Another objective of the present invention is to provide a ground leveler attachment for a ground working device which resiliently retracts around such immoveable objects.

Also, another objective of the present invention is to provide a ground leveler attachment for a ground working device which allows each leveler to resiliently retract independently of each other unlike the prior art where the entire gang section retracts together.

Further, another objective of the present invention is to provide a ground leveler attachment for a ground working device which allows the levelers not impacted by immoveable objects to remain in a ground engagement position rather than come off the ground and essentially miss sections of the ground.

Yet, another objective of the present invention is to provide a ground leveler attachment for a ground working device which will automatically spring back into a ground engagement position upon passing the relatively immoveable object.

Further objectives and advantages of the present invention will become apparent as the description proceeds and when taken in conjunction with the accompanying drawings wherein:

DETAILED DESCRIPTION OF THE INVENTION

Figure 1:
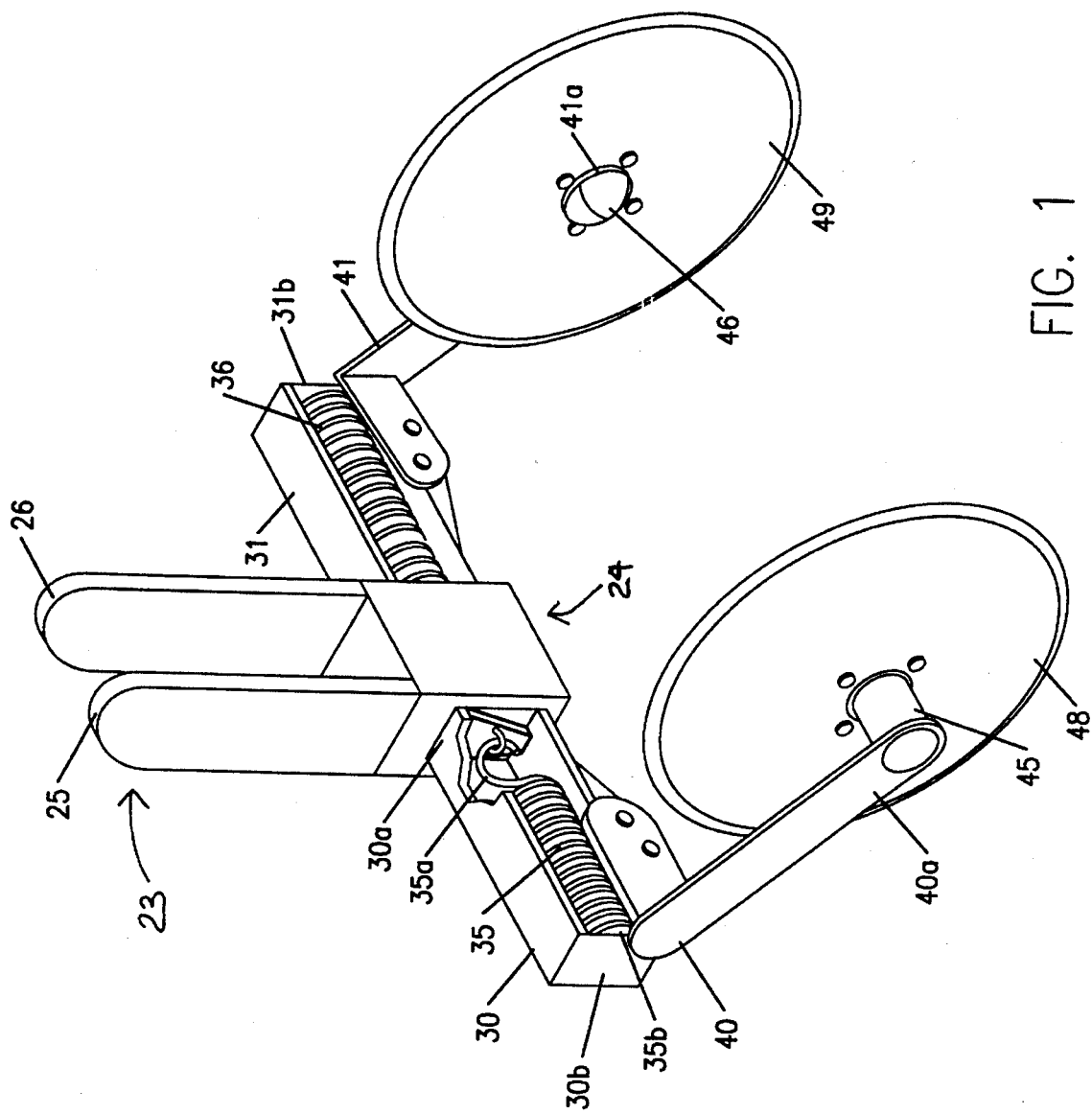
FIG. 1 is a perspective view of the ground leveler attachment for a ground working device.
Figure 2:
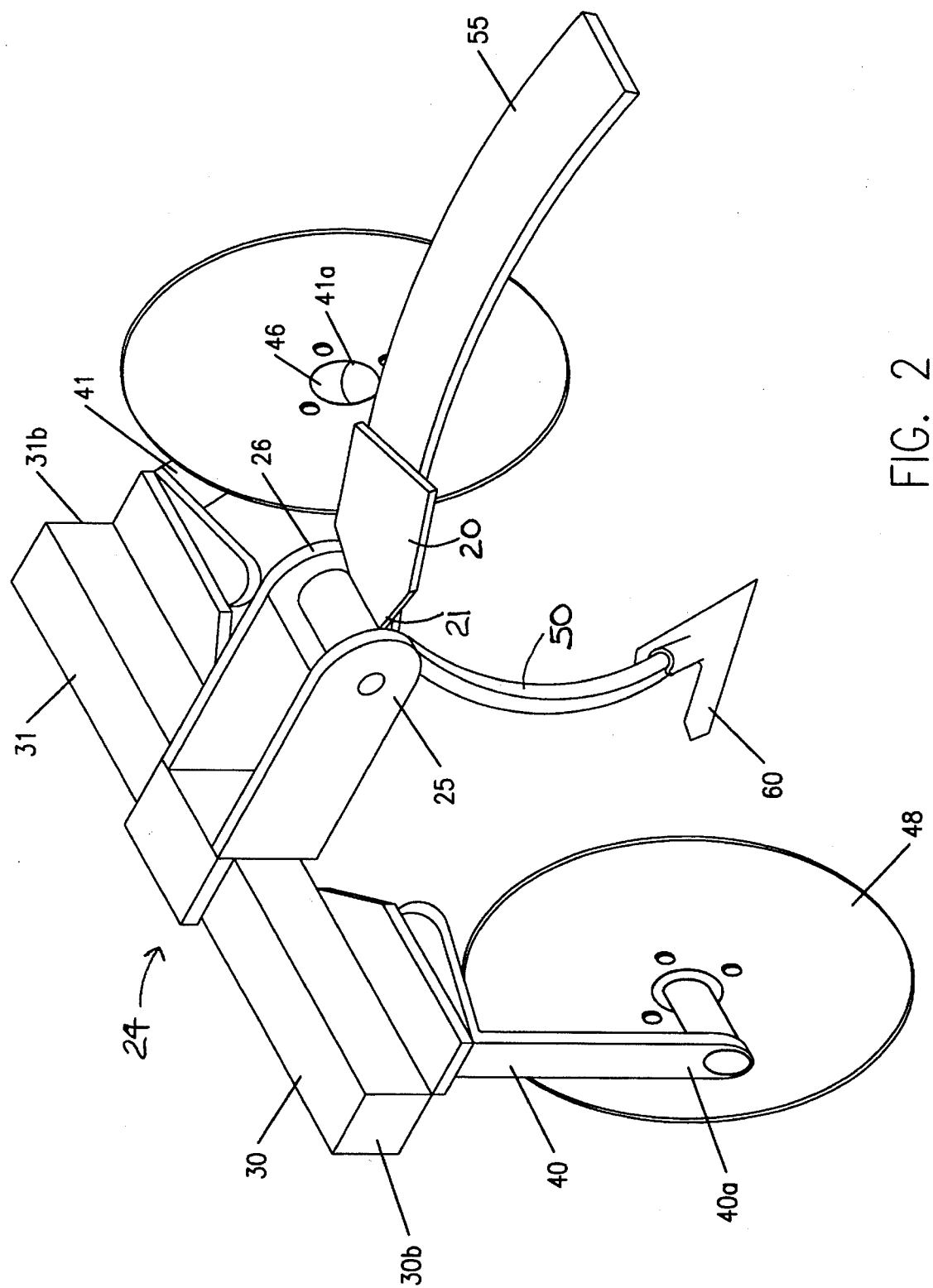
FIG. 2 is a perspective view of the ground level attachment attached to a shank of a ground working device.
Figure 3:
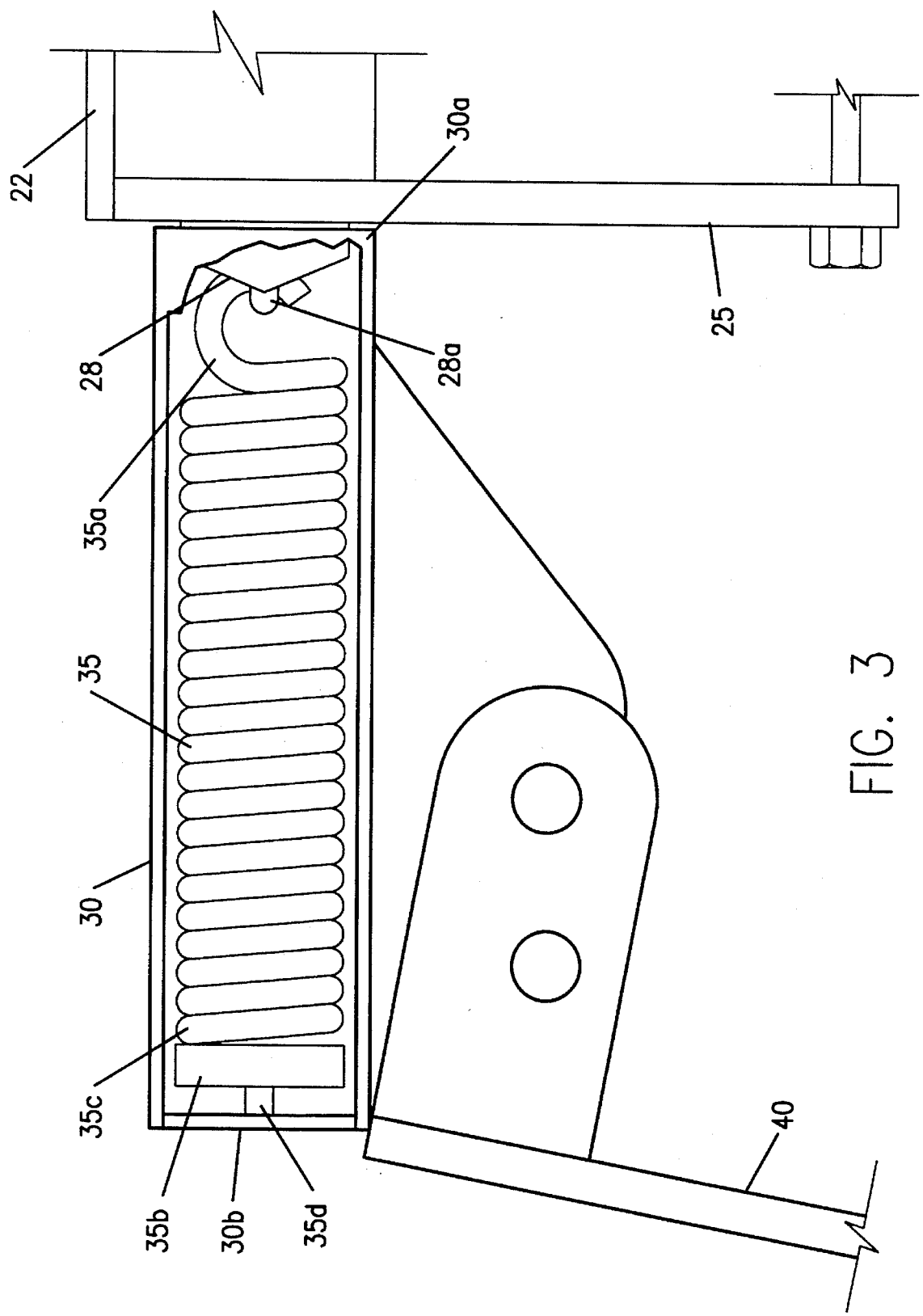
FIG. 3 is a detailed breakaway side view of one of the leg supports and carrier arm showing, in particular, the spring means connected to the pivot mount and the spring means support adjustably threaded to a threaded member fastened to the leg support.
Figure 4:
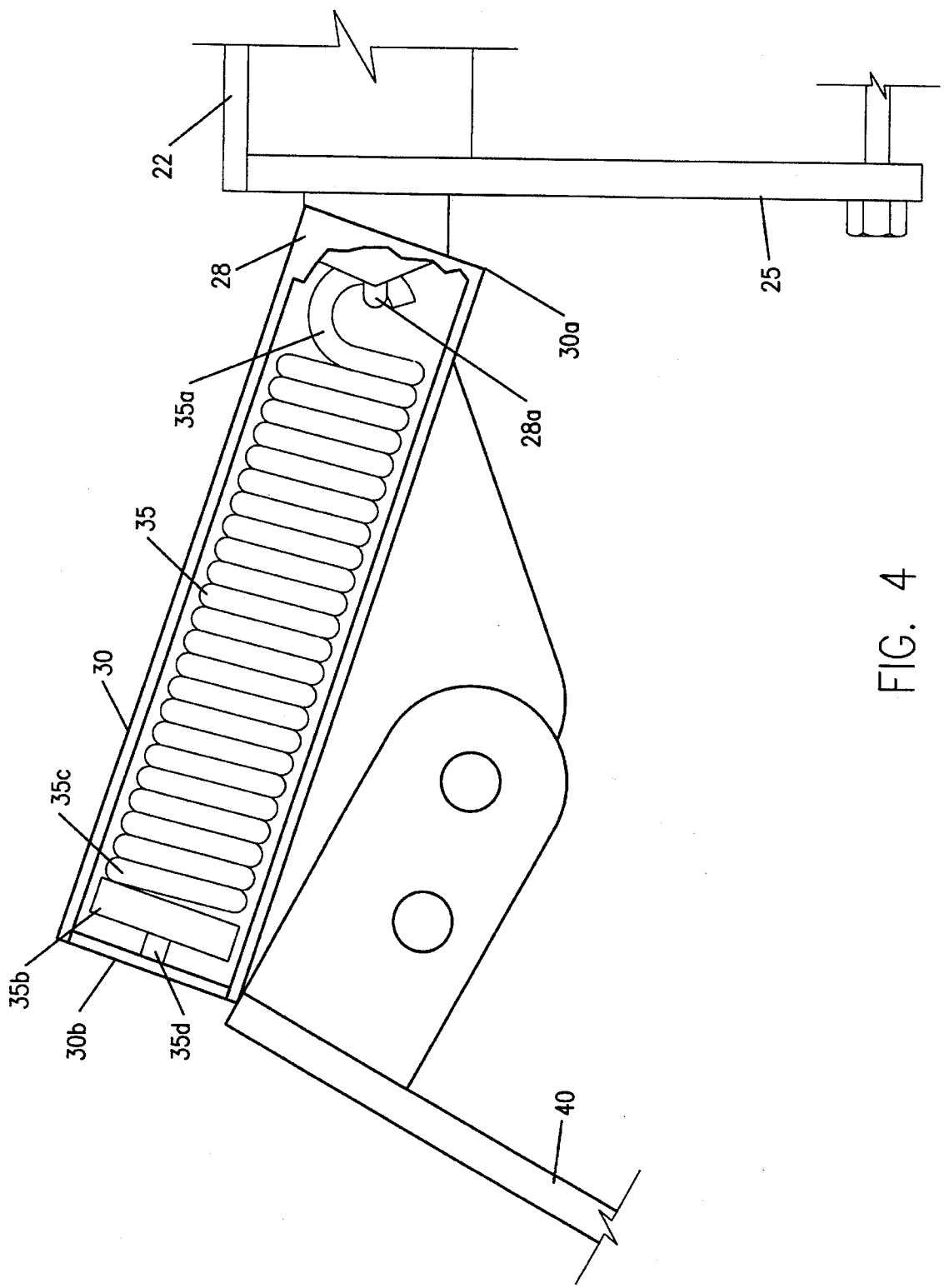
FIG. 4 is a detailed breakaway side view of one of the levelers, leg members, and leg supports pivoted relative to the carrier arm and further showing the spring means, spring means support, pivot mount, and the threaded member of the ground leveler attachment.

Referring to the drawings in FIGS. 1–4, the ground leveler attachment for a ground working device comprises a bracket 20 having a substantially flat surface and being fastenably attachable with bolts or the like to a back side of a medial portion of a shank 55 supporting a ground breaking tool 60 on a ground working device 50, and further comprises a generally U-shaped carrier arm 22 having a proximal end 23 pivotally attached to a bottom edge 21 of the bracket 20. The carrier arm 22 extends rearwardly relative to the shank 55 and to the ground breaking tool 60 and has a pair of generally pyramidal-shaped pivot mounts 28,29 fixedly attached to the sides 25,26 of the carrier arm 22 near the distal end 24 thereof. The pivot mounts 28,29 extend outward from the sides 25,26 of the carrier arm 22 and are in general alignment to one another and each of the pivot mounts 28,29 has an eyelet 28a, 29a. A pair of elongate leg supports 30,31 each having a first end 30a,31a and a second end 30b,31b are disposed generally perpendicular to the carrier arm 22 and are generally in alignment to each other and extend in opposite directions from near the distal end 24 of the carrier arm 22. The elongate leg supports 30,31 are adapted to extend beyond the lateral reach of the ground breaking tool 60, and the first ends 30a,31a of the leg supports 30,31 are open and adapted to receive and pivot about the pivot mounts 28,29.

As shown in FIGS. 1–4, the ground leveling attachment 15 also comprises a pair of spring means 35,36 preferably compression springs disposed generally parallel to the leg supports 30,31 for urging the first ends 30a,31a of the leg supports 30,31 into pivotal contact with the sides 25,26 of the carrier arm 22. Each of the spring means 35,36 has a hook-like end 35a,36a extending through the respective first end 30a,31a of the leg support 30,31 and is securely fastened to the respective eyelet 28a,29a on the pivot mount 28,29. A pair of spring means supports 35b,36b are securely engaged in the ends 35c,36c of the spring means 35,36 opposite the hook-like ends 35a,36a and are adjustably threaded on threaded members 35d,36d fixedly disposed in the inner side of the second ends 30b,31b of the leg supports 30,31. A pair of leg members 40,41 are fixedly attached to the leg supports 30,31 and depend generally downward therefrom. A pair of leveler supports 45,46 are fixedly attached to near the bottom ends 40a,41a of the leg members 40,41. A pair of levelers 48,49 preferably disks are rotatably and axially mounted upon the leveler supports 45,46 for engaging and leveling the ground. The spring means 35,36 essentially bias the levelers 48,49 into a ground engagement position and can be easily removed and replaced by simply threading the spring means 35,36 supports off the threaded members 35d,36d and then removing the hook-like ends 35a,36a from the eyelets 28a,29a. The user can easily adjust the tension of the spring means 35,36 either by threading the spring means supports 35b,36b farther onto the threaded members 35d,36d to increase the tension of the spring means 35,36 to put more ground engagement pressure on the levelers 48,49 or by threading the spring means supports 35b,36b toward the off end of the threaded members 35d,36d to decrease the tension of the spring means 35,36 to put less ground engagement pressure on the levelers 48,49 so that the levelers will, in essence, resiliently retract more easily in response to a relatively immoveable force striking the levelers.

In operation, the disks are slightly disposed at an angle relative to the direction of movement of the ground working device with the leading edges 48a,49a of the levelers 48,49 disposed away from the each other. As the ground working device moves upon the ground and as the ground breaking tool 60 breaks up, loosens, and churns the soil to either side of itself thus creating a furrow defined by two spaced-apart rows of soil, the levelers 48,49 follow along behind the ground breaking tool and beyond the lateral reach of the ground breaking tool and engage the rows of soil and essentially spread or move the soil back over the furrow to level the ground to promote even runoff of rain or irrigation water. Should the levelers 48,49 come into contact with a relatively immoveable object or objects such as rocks and boulders, the levelers 48,49 will resiliently retract in response to the force or contact and will spring back into a ground engagement position upon passing the relatively immoveable force. As the levelers 48,49 resiliently retract in the direction of the force, the leg supports 30,31 pivot about their first ends 30a,31a relative to the carrier arm 22 to move the levelers 48,49 up and outward relative to the ground breaking tool 60 and the shank 55. This ground leveler attachment substantially prevents the breaking or bending of the levelers and effectively saves the user time and expense from having to replace broken or bent levelers.

Various changes and departures may be made to the invention without departing from the spirit and scope thereof. Accordingly, it is not intended that the invention be limited to that specifically described in the specification or as illustrated in the drawings but only as set forth in the claims:

What is claimed is:

1. A ground leveler attachment for a ground working device comprising:

a mounting means for securely mounting said ground leveler attachment to said ground working device, said mounting means being securely mounted to a shank supporting a ground breaking tool of said ground working device;

a leveler support means attached to said mounting means and including a carrier arm having a distal end, a pair of leg supports being in pivotal and contactable relationship to said carrier arm which has a pair of pivot mounts attached thereto, a pair of leg members attached to said leg supports, and a pair of leveler support said leg members, said pivot mounts adapted to be received in selected ends of said leg supports and for positioning said leg supports relative to said carrier arm, each of said pivot mounts having a lateral cross-section consistent with the lateral cross-section of said leg supports for restricting movement of said leg supports;

a pair of levelers attached to said leveler support means for leveling the ground; and bias means for biasing said levelers into a ground engagement position.

2. A ground leveler attachment for a ground working device as described in claim 1, wherein each of said leg supports has a first end which is in pivotal and contactable relationship to a side of said carrier arm near said distal end.

3. A ground leveler attachment for a ground working device as described in claim 2, wherein each of said leg supports is adapted to extend beyond a lateral reach of said ground breaking tool.

4. A ground leveler attachment for a ground working device as described in claim 3, wherein said leg members depend from said leg supports.

5. A ground leveler attachment for a ground working device as described in claim 4, wherein said levelers are mounted upon said leveler supports such that said levelers are engageable with the ground.

6. A ground leveler attachment for a ground working device as described in claim 5, wherein said levelers are rotatably mounted upon said leveler supports.

7. A ground leveler attachment for a ground working device as described in claim 6, wherein each of said levelers is a disk.

8. A ground leveler attachment for a ground working device as described in claims 3, wherein said bias means includes a pair of spring means, a pair of spring means supports engaged to said pair of spring means for connecting said spring means to said leg supports.

9. A ground leveler attachment for a ground working device as described in claim 8, wherein said spring means supports are threaded upon threaded members fastened to said leg supports for adjusting the tension of said spring means.

10. A ground leveler attachment for a ground working device as described in claim 9, wherein said pair of spring means are removeably connected to said pivot mounts.

11. A ground leveler attachment for a ground working device comprising:

a bracket fastenable to a shank of said ground working device;

a carrier arm fastened to said bracket and having a pair of pivot mounts fixedly attached thereto, said pivot mounts being attached to and extended from either side of said carrier arm;

a pair of ground engageable levelers;

means for supporting said pair of ground engageable levelers, said support means including a pair of leg supports each having a first end and being pivotally contactable to said carrier arm and also having a threaded member fastenable thereto, said pivot mounts adapted to be received in said first ends of said leg supports and to orientate the positioning of said leg supports which are capable of pivoting about said pivot mounts; and bias means for holding said leg supports into pivotal contactable relationship with said carrier arm and for biasing said levelers in a ground engagement position, each of said pivot mounts further having an eyelet to which said bias means is removeably connected.

12. A ground leveler attachment as described in claim 11, wherein each of said pivot mounts have a generally pyramid configuration.

13. A ground leveler attachment as described in claim 12, wherein said bias means comprise a pair of spring means and a pair of spring means supports engaged in said spring means and threadingly mounted upon said threaded member for adjusting the tension of said spring means.

* * * * *